United States Patent [19]
Davison et al.

[11] Patent Number: 5,943,861
[45] Date of Patent: Aug. 31, 1999

[54] HYDRAULIC SYSTEM FOR MOTOR VEHICLE

[75] Inventors: James Leroy Davison, Freeland; Scott William Clifford, Bay City; David R. Aden; James Leibinger, both of Saginaw, all of Mich.

[73] Assignee: General Motors Corporation, Detroit, Mich.

[21] Appl. No.: 08/990,980

[22] Filed: Dec. 15, 1997

[51] Int. Cl.⁶ ..................................................... F16D 31/02
[52] U.S. Cl. ............................................... 60/453; 60/486
[58] Field of Search ...................... 60/453, 486

[56] References Cited

U.S. PATENT DOCUMENTS

| | | | |
|---|---|---|---|
| B 358,939 | 1/1975 | Bessiere | 60/453 |
| 2,174,850 | 10/1939 | Svenson | 60/453 |
| 2,962,863 | 12/1960 | Caroli | 60/453 |
| 4,531,368 | 7/1985 | Killen | 60/453 |
| 4,794,883 | 1/1989 | Fukami et al. | |
| 4,798,050 | 1/1989 | Nakamura et al. | |
| 5,477,882 | 12/1995 | Duthie | 60/486 |

FOREIGN PATENT DOCUMENTS

| | | | |
|---|---|---|---|
| 579433 | 8/1956 | Italy | 60/453 |

*Primary Examiner*—F. Daniel Lopez
*Attorney, Agent, or Firm*—Edmund P. Anderson

[57] ABSTRACT

A hydraulic system for a motor vehicle having a first flow circuit for steering power assist and a second flow circuit for a radiator cooling fan. The first flow circuit includes a reservoir, a power steering pump connected to the reservoir through a first inlet conduit and a first return conduit, a steering assist fluid motor, and a first flow control valve. The second flow circuit includes the aforesaid reservoir, a second pump connected to the reservoir through a second inlet conduit and a second return conduit, a second fluid motor for the radiator cooling fan in the second return conduit, and a second flow control valve. Fluid in the first return conduit is conducted into the reservoir substantially without turbulence. Fluid in the second return conduit is conducted into the reservoir as a jet stream aimed at a submerged passage in a venturi tube. The submerged passage communicates with a feeder conduit between the reservoir and each of the first and the second inlet conduits. The kinetic energy of the jet stream is converted into fluid pressure in the feeder conduit and in each of the first and the second inlet conduits to suppress cavitation.

5 Claims, 2 Drawing Sheets

HYDRAULIC SYSTEM FOR MOTOR VEHICLE

RELATED PATENT APPLICATION

The subject matter described and claimed in this patent application is related to the subject matter described and claimed in U.S. patent application Ser. No. 08/919,517, filed Aug. 28, 1997 and assigned to the assignee of this invention.

TECHNICAL FIELD

This invention relates to a motor vehicle hydraulic system including multiple pumps and multiple fluid motors for accessories of the motor vehicle.

BACKGROUND OF THE INVENTION

U.S. Pat. Nos. 4,794,883 and 4,798,050 describe motor vehicle hydraulic systems having separate flow circuits for steering power assist and for a second accessory of the motor vehicle, e.g., a radiator cooling fan. A first of the two flow circuits includes a reservoir, a power steering pump connected on an upstream side to the reservoir through a first inlet conduit and on a downstream side to the reservoir through a first return conduit, a steering assist fluid motor, and a first control valve in the first return conduit for managing fluid flow between the first return conduit and each of a pair of working chambers of the steering assist fluid motor. A second one of the two flow circuits includes the aforesaid reservoir, a second pump connected on an upstream side to the reservoir through a second inlet conduit and on a downstream side to the reservoir through a second return conduit, a second fluid motor in the second return conduit for driving the radiator cooling fan, and a second control valve for managing fluid flow through the second fluid motor.

SUMMARY OF THE INVENTION

This invention is a new and improved hydraulic system for a motor vehicle having a first flow circuit for steering power assist and a second flow circuit for a second accessory of the motor vehicle, e.g., a radiator cooling fan. The first flow circuit includes a reservoir, a power steering pump connected on an upstream side to the reservoir through a first inlet conduit and on a downstream side to the reservoir through a first return conduit, a steering assist fluid motor, and a first control valve in the first return conduit for managing fluid flow between the first return conduit and each of a pair of working chambers of the steering assist fluid motor. The second flow circuit includes the aforesaid reservoir, a second pump connected on an upstream side to the reservoir through a second inlet conduit and on a downstream side to the reservoir through a second return conduit, a second fluid motor for driving the radiator cooling fan, and a second control valve for managing fluid flow through the second fluid motor. Fluid in the first return conduit flows into the reservoir with minimal turbulence and is deaerated in the reservoir. Fluid in the second return conduit flows into the reservoir as a jet stream from a nozzle on the reservoir aimed at a passage in a venturi tube submerged in fluid in the reservoir. The passage in the venturi tube communicates with a feeder conduit connected to each of the first and the second inlet conduits. The jet stream aspirates fluid from the reservoir into the venturi tube passage at a flow rate corresponding generally to the flow rate in the first flow circuit. The kinetic energy of the jet stream is converted into fluid pressure in the feeder conduit and in each of the first and the second inlet conduits to suppress cavitation at the power steering pump and at the second pump.

DESCRIPTION OF THE PREFERRED EMBODIMENT

Figure 1:
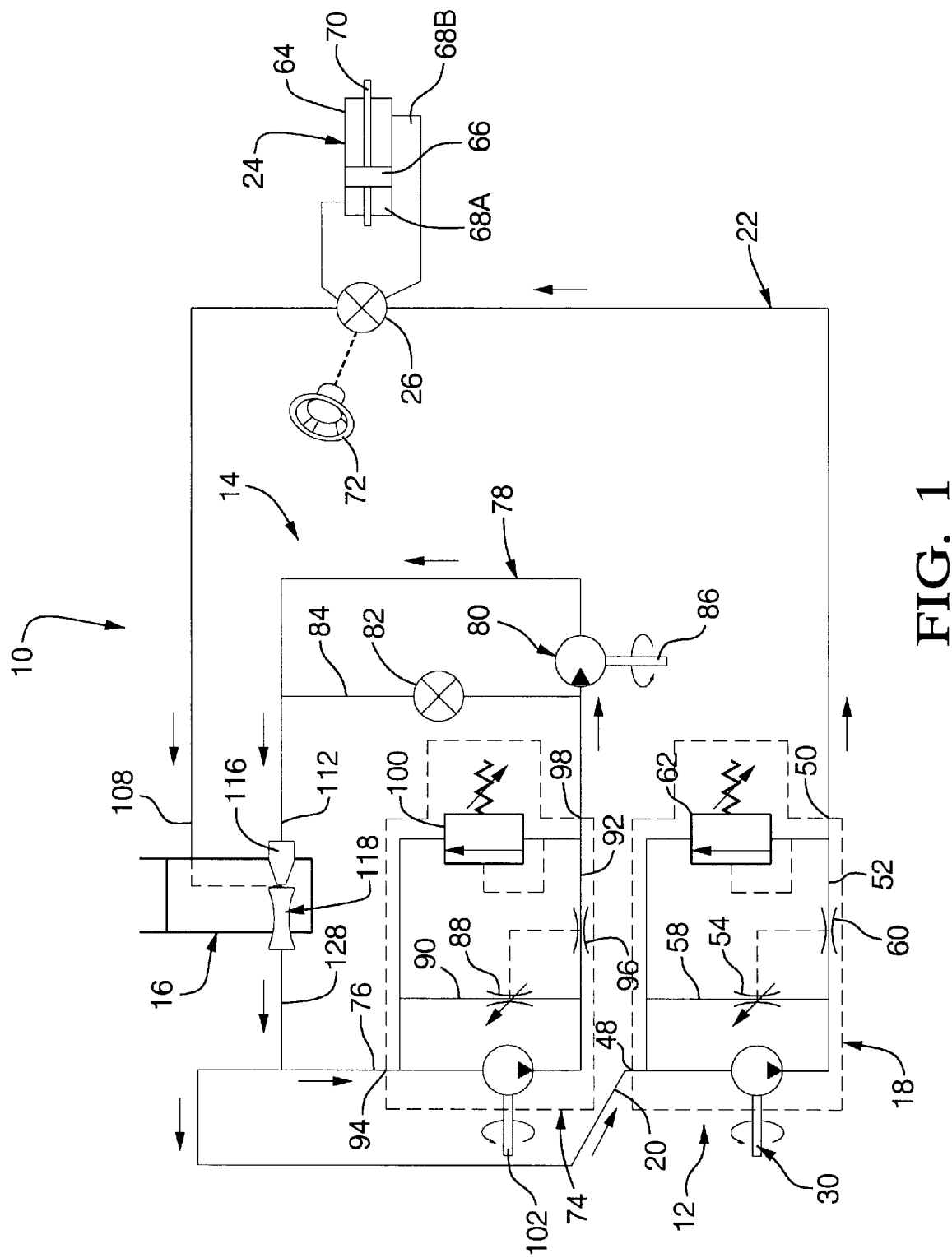
FIG. 1 is a schematic representation of a motor vehicle hydraulic system according to this invention.

A schematically-represented motor vehicle hydraulic system 10 according to this invention, FIG. 1, includes a first flow circuit 12 for steering power assist and a second flow circuit 14 for another accessory, not shown, of the motor vehicle such as a radiator cooling fan. The first flow circuit 12 includes a fluid reservoir 16, a power steering pump 18 such as described in U.S. Pat. No. 4,386,891, issued Jan. 7, 1983 and assigned to the assignee of this invention, a first inlet conduit 20 upstream of the power steering pump, a first return conduit 22 downstream of the power steering pump, a steering assist fluid motor 24, and a first control valve 26 in the first return conduit 22.

As described in the aforesaid U.S. Pat. No. 4,386,891, the disclosure of which is incorporated herein by reference, the power steering pump 18 includes a stationary housing 28, an input shaft 30, and a rotating group 32 between a non-rotating pressure plate 34 on the housing and a non-rotating thrust plate 36 on the housing. The input shaft 30 is rotatably supported on the housing 28 and the thrust plate 36 by a pair of bearings 38A, 38B. An end 40 of the input shaft 30 outside of the housing 28 is connected to a motor, not shown, of the motor vehicle or to another prime mover on the motor vehicle, e.g., an electric motor.

The rotating group 32 of the power steering pump includes a rotor 42 rigidly attached to the input shaft 30 and a plurality of radially slidable vanes 44 on the rotor which cooperate with a stationary cam surface 46 around the rotor and with the thrust plate 36 and the pressure plate 34 in defining a plurality of pump chambers, not shown, which expand and collapse as the rotor rotates with the input shaft 30. The expanding pump chambers are in flow communication with an inlet port 48 of the power steering pump. The collapsing pump chambers are in flow communication with a discharge port 50 of the power steering pump through a schematically-represented internal conduit 52, FIG. 1, in the housing 28 of the pump.

Figure 2:
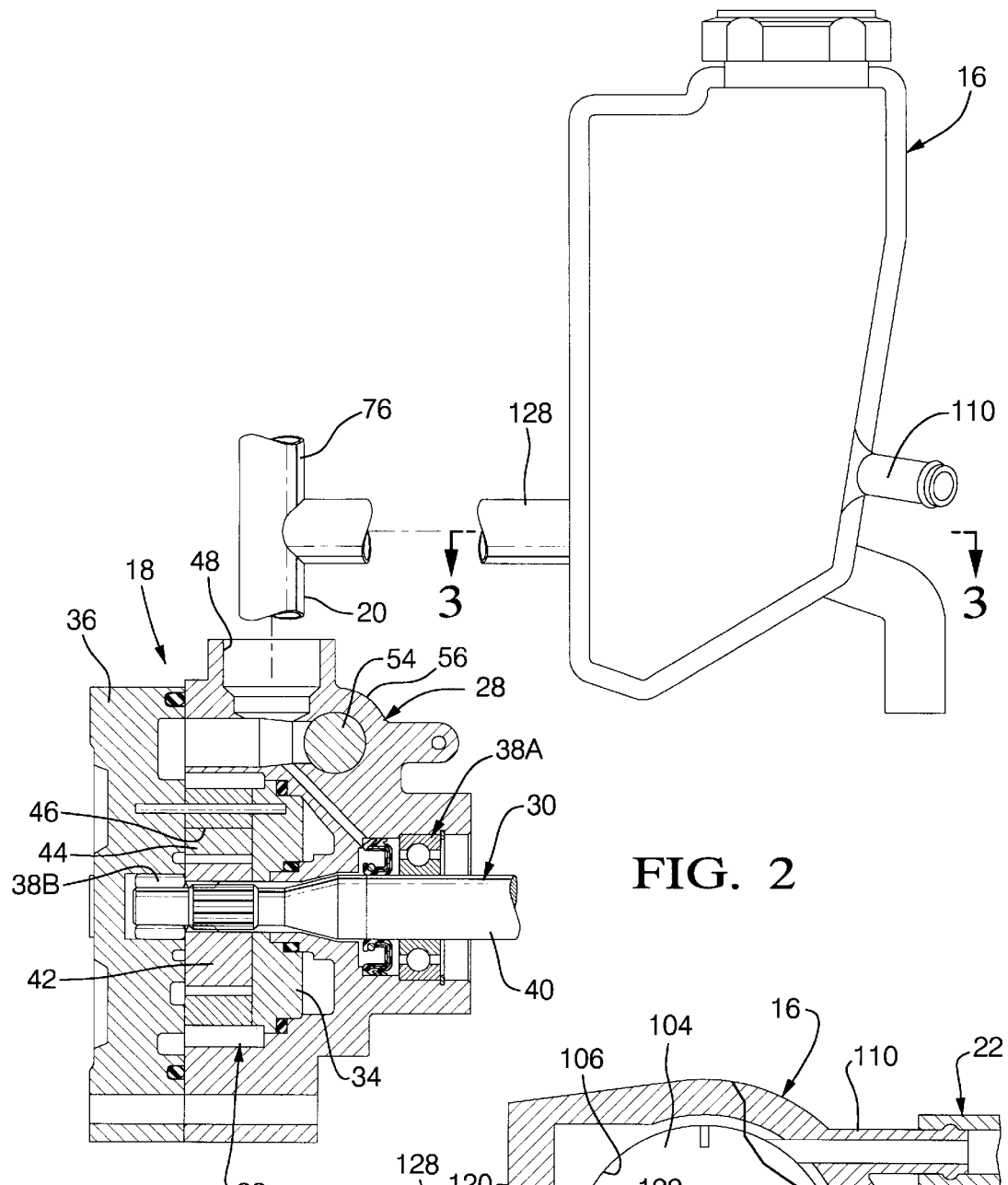
FIG. 2 is a fragmentary, partially broken-away elevational view of a power steering pump and a reservoir of the motor vehicle hydraulic system according to this invention.

The power steering pump 18 further includes a schematically-represented internal flow control valve 54, FIG. 1, in a boss 56, FIG. 2, on the stationary housing 28. The internal flow control valve 54 is disposed in a recirculation passage 58 in the stationary housing 28 between the internal conduit 52 and the inlet port 48. The internal flow control valve 54 transitions progressively from closed to fully open in response to an increasing pressure gradient across a restriction 60 in the internal conduit 52. When the internal flow control valve is closed, there is no recirculation to the inlet port 48. As the internal flow control valve 54 opens, progressively more fluid recirculates directly to the inlet port 48 to maintain the flow rate from the discharge port 50 of the power steering pump substantially constant and to suppress cavitation at the inlet port. A schematically-represented pressure relief valve 62 of the power steering pump 18 opens only in extraordinary circumstances.

The schematically-represented steering assist fluid motor 24 may be a structural element of a motor vehicle rack and pinion power steering gear such as described in U.S. Pat. No. 4,454,801, issued Jun. 19, 1984 and assigned to the assignee of this invention, the disclosure of which is incorporated herein by reference. The steering assist fluid motor includes a stationary cylinder 64, a piston 66 dividing the cylinder into a pair of working chambers 68A, 68B, and a rod 70 rigidly attached to the piston and linked to dirigible wheels, not shown, of the motor vehicle such that back and forth linear translation of the rod steers the dirigible wheels.

The schematically-represented first control valve 26 in the first return conduit 22 may have the construction described in the aforesaid U.S. Pat. No. 4,454,801. In the absence of manual effort at a steering hand wheel 72 of the motor vehicle connected to a valve spool, not shown, of the first control valve 26, fluid in the first return conduit 22 flows substantially unimpeded from the discharge port 50 of the power steering pump to the reservoir 16. When manual effort is applied at the steering hand wheel 72, the first control valve 26 creates a steering assist boost pressure upstream of the valve by restricting fluid flow in the first return conduit 22 and directs such boost pressure to an expanding one of the working chambers 68A, 68B of the steering assist fluid motor. At the same time, the first control valve maintains a connection between an opposite collapsing one of the working chambers 68A, 68B and the first return conduit 22 downstream of the first control valve.

The second flow circuit 14 includes the fluid reservoir 16, a second pump 74, a second inlet conduit 76 upstream of the second pump, a second return conduit 78 downstream of the second pump, a second fluid motor 80, and a second control valve 82 in a bypass conduit 84 around the second fluid motor. The second fluid motor 80 may have any conventional construction and includes a schematically-represented rotary output shaft 86 adapted for driving the aforesaid radiator cooling fan.

The second pump 74 may have substantially the same construction as the power steering pump 18 and includes a schematically-represented internal flow control valve 88 in a recirculation passage 90 between an internal conduit 92 in a housing of the second pump and an inlet port 94 of the second pump. The internal flow control valve 88 transitions progressively from closed to fully open in response to an increasing pressure gradient across a restriction 96 in the internal conduit 92. When the internal flow control valve is closed, there is no recirculation to the inlet port 94, and all of the fluid in the internal conduit 92 is discharged from the second pump into the second return conduit 78 through a discharge port 98 of the second pump. As the internal flow control valve 88 opens, progressively more fluid recirculates directly to the inlet port 94 to maintain the flow rate from the discharge port 98 substantially constant and to suppress cavitation at the inlet port. A schematically-represented pressure relief valve 100 of the second pump 74 opens only in extraordinary circumstances. An input shaft 102 of the second pump may be driven by the motor of the motor vehicle or by a separate prime mover and may also be rigidly connected to the input shaft of the power steering pump for unitary rotation therewith.

The internal flow control valve 88 of the second pump 74 is calibrated to produce a relatively constant fluid flow rate in the second flow circuit 14 of about 10 gallons per minute corresponding to operation of the second fluid motor 80 for maximum radiator cooling. The internal flow control valve 54 of the power steering pump 18 is calibrated to produce a relatively constant fluid flow rate in the first flow circuit 12 of about three gallons per minute required to operate the steering assist fluid motor 24. Because of the difference in fluid flow rates in the first and the second flow circuits, the first flow circuit 12 constitutes a low flow circuit of the hydraulic system 10 and the second flow circuit 14 constitutes a high flow circuit of the hydraulic system.

The fluid flow rate in the second flow circuit 14 represents a substantial fraction of the capacity of the second pump 74 and dictates that the internal flow control valve 88 thereof remains closed most of the time so that there is little or no recirculation in the recirculation passage 90 to suppress cavitation at the inlet port 94 of the second pump. For less than maximum radiator cooling, the schematically-represented second control valve 82 opens to bypass a fraction of the fluid flowing in the second return conduit 78 around the second fluid motor 80.

Figure 3:
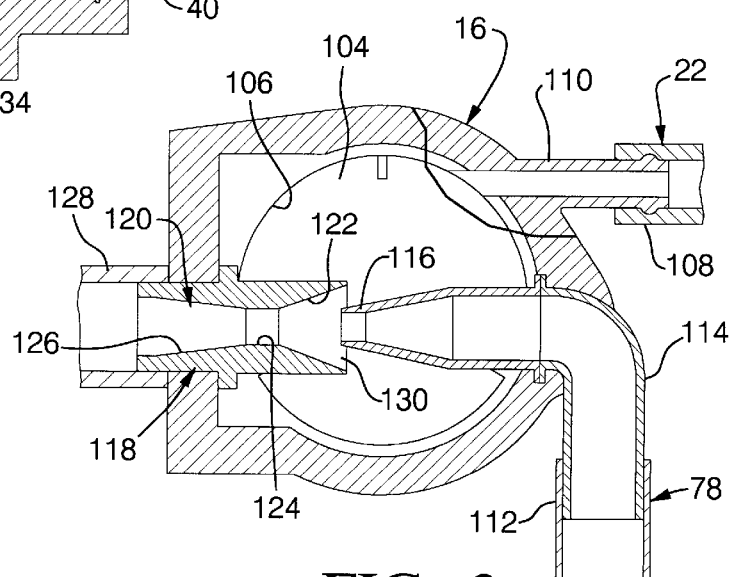
FIG. 3 is a sectional view taken generally along the plane indicated by lines 3—3 in FIG. 2.

As seen best in FIGS. 2–3, the reservoir 16 has an internal chamber 104 maintained at atmospheric pressure defined within a cylindrical wall 106 of the reservoir. A downstream end 108 of the first return conduit 22 communicates with the internal chamber 104 of the reservoir through a return port defined by an unrestricted tubular boss 110 on the reservoir substantially tangent to the cylindrical wall 106. A downstream end 112 of the second return conduit 78 communicates with the internal chamber 104 of the reservoir through a tubular elbow 114 on the reservoir having a restriction at an end thereof defining a nozzle 116. A venturi tube 118 on the reservoir is submerged in fluid in the internal chamber 104 and has a passage 120 therein including a convergent portion 122, a throat 124, and a diffuser portion 126. The passage 120 is connected to each of the first and the second inlet conduits 20, 76 through a feeder conduit 128. The nozzle 116 is aimed at the throat 124 of the passage 120.

In the absence of manual input at the steering hand wheel 72, fluid flowing from the discharge port 50 of the power steering pump circulates through the first return conduit 22 and through the first control valve 26 and discharges into the internal chamber 104 of the reservoir 16 through the return port defined by the tubular boss 110. Because of the relatively low flow rate in the low flow branch and the substantial tangency of the tubular boss with the wall 106 of the internal chamber, fluid flow into the reservoir through the tubular boss 110 is substantially without turbulence. When steering power assist is initiated by the application of manual effort at the steering hand wheel 72, the first control valve 26 directs fluid flowing in the first return conduit upstream of the valve into an expanding one of the working chambers 68A, 68B of the steering assist fluid motor 24 and fluid in an opposite, collapsing one of the working chambers 68A, 68B back into the first return conduit downstream of the valve. Fluid thus expelled from the collapsing one of the working chambers flows into the reservoir through the tubular boss 110 substantially without turbulence.

At the same time, fluid flowing from the discharge port 98 of the second pump 94 circulates through the second return conduit 78 and the second fluid motor 80 and discharges into the internal chamber 104 of the reservoir 16 through the nozzle 116. Because of the relatively high flow rate in the second flow circuit, a jet stream of fluid issues from the nozzle 116 into the passage 120 in the venturi tube 118 across a submerged gap 130 between the nozzle 116 and the convergent portion 122 of the venturi tube passage. The jet stream aspirates make-up flow from the reservoir into the venturi tube passage 120 at a flow rate corresponding generally to the flow rate in the low flow circuit of the hydraulic system. The kinetic energy of the jet stream is converted into superatmospheric fluid pressure in the diffuser portion 126 of the venturi tube passage and, consequently, in the feeder conduit 128, in each of the first and the second inlet conduits 20, 76, and at inlet ports 48, 94 of the power steering pump 18 and of the second pump 74. Such superatmospheric pressure at the inlet ports 20, 76 suppresses cavitation regardless of whether the internal flow control valves 54, 88 of the power steering pump and the second pump are open or closed.

Importantly, fluid from the first flow circuit 12 which enters the internal chamber 104 of the reservoir without turbulence through the tubular boss 110 dwells in the internal chamber for a time duration sufficient for deaeration through natural release of entrained gas bubbles before such fluid is aspirated into the venturi tube passage 120. Because all of the fluid in the first flow circuit 12 and in the second flow circuit 14 flows through and mixes in the feeder conduit 128, all of the fluid in the hydraulic system 10 eventually circulates through the first flow circuit and becomes deaerated in the reservoir.

Having thus described the invention, what is claimed is:

1. In a hydraulic system for a motor vehicle including
   a first flow circuit including a reservoir having an internal chamber, a power steering pump, a first inlet conduit connected to an inlet port of said power steering pump, a first return conduit connected to a discharge port of said power steering pump, a steering assist fluid motor means, and a first control valve means in said first return conduit connected to said steering assist fluid motor operative to conduct fluid in said first return conduit upstream of said first control valve to a first working chamber of said steering assist fluid motor and to conduct fluid expelled from a second working chamber of said steering assist fluid motor into said first return conduit downstream of said first control valve, and
   a second flow circuit including said reservoir, a second pump, a second inlet conduit connected to an inlet port of said second pump, a second return conduit connected to a discharge port of said second pump, a second fluid motor means in said second return conduit, and a second control valve means in said second return conduit operative to vary the flow rate of fluid through said second fluid motor,
   the improvement comprising:
   a return port means on said reservoir connected to said first return conduit downstream of said first control valve operative to conduct fluid from said first return conduit into said internal chamber of said reservoir substantially without turbulence,
   a venturi means operative to define a venturi passage on said reservoir submerged in fluid in said internal chamber of said reservoir having a convergent portion and a diffuser portion and a throat between said convergent portion and said diffuser portion,
   a feeder conduit connected to said venturi means downstream of said diffuser portion of said venturi passage and to each of said first inlet conduit and said second inlet conduit, and
   a nozzle means on said reservoir connected to said second return conduit operative to conduct fluid from said second return conduit into said internal chamber of said reservoir as a jet stream aimed at said throat of said venturi passage thereby to aspirate fluid from said internal chamber of said reservoir into said venturi passage through said convergent portion of said venturi passage,
   the kinetic energy of said jet stream being converted into superatmospheric pressure in said diffuser portion of said venturi passage and in each of said feeder conduit and said first and said second inlet conduits to suppress cavitation at said inlet ports of each of said power steering pump and said second pump, and
   said fluid conducted into said internal chamber of said reservoir through said return port means dwelling in said internal chamber for a time duration sufficient for natural separation from said fluid of entrained gas bubbles.

2. The motor vehicle hydraulic system recited in claim 1 wherein said return port means on said reservoir comprises:
   a passage on said reservoir connected to said first return conduit downstream of said first control valve intersecting said internal chamber of said reservoir adjacent to a wall of said internal chamber so that fluid conducted into said internal chamber flows substantially along said wall.

3. The motor vehicle hydraulic system recited in claim 2 wherein:
   said wall of said internal chamber of said reservoir is an arcuate wall, and
   said passage on said reservoir connected to said first return conduit downstream of said first control valve intersects said internal chamber of said reservoir tangent to said arcuate wall.

4. The motor vehicle hydraulic system recited in claim 1 wherein said nozzle means on said reservoir comprises:
   a tube on said reservoir connected to said second return conduit downstream of said second fluid motor having a restriction at an end thereof defining a nozzle aimed at said throat of said venturi passage.

5. The motor vehicle hydraulic system recited in claim 4 wherein said venturi means comprises:
   a venturi tube mounted on said reservoir having formed therein said venturi passage including said convergent portion and diffuser portion and said throat between said convergent portion and said diffuser portion.

* * * * *